UNITED STATES PATENT OFFICE.

JAMES DACIE WRIGGLESWORTH AND FREDERICK CHARLES BINNS, OF WELLINGTON, NEW ZEALAND.

PROCESS OF GIVING A MATTE SURFACE TO ALBUMENIZED-SILVER-PAPER PHOTOGRAPHS.

SPECIFICATION forming part of Letters Patent No. 460,621, dated October 6, 1891.

Application filed April 18, 1890. Serial No. 348,537. (No specimens.)

*To all whom it may concern:*

Be it known that we, JAMES DACIE WRIGGLESWORTH and FREDERICK CHARLES BINNS, subjects of the Queen of Great Britain, residing in the city of Wellington and Colony of New Zealand, have invented an Improved Process for Giving a Matte Surface to Albumenized-Silver-Paper Photographs or Prints; and we do hereby declare that the following is a full, clear, and exact description of the invention, which will enable others skilled in the art to which it appertains to make and use the same.

Our invention has for its objects giving a matte surface resembling matte-opal plates or unpolished white marble to albumenized-silver prints.

In order that our invention may be most easily understood, we will now proceed to describe the same.

We take a sheet of finely-ground glass, (preferably plate-glass,) marble, slate, metal, or other material having on one side a finely-ground or unpolished matte surface for a support for the albumenized-silver prints to be treated and coat it by means of a pledget of flannel with the following mixture, called the "waxing compound:" dissolve by heat best beeswax three drams, yellow resin three drams, in spirits of turpentine, one pint. The proportions of the beeswax and resin vary with the temperature of the air. When very warm, the resin should be present in greater proportion than the beeswax. It is impossible to give a certain formula for every degree of temperature, but the above is correct for general conditions in temperate climates.

The coating is done in the following manner: Pour a quantity of the waxing compound sufficient to coat a plate onto the pledget of flannel and rub the ground or matte surface with a rapid circular motion until the whole is evenly coated. Then polish with a clean linen cloth until the surface is smooth and free from waves, streaks, or marks, taking care in doing so to leave a thin even film of the compound on the plate. When the plate has thus been treated, set it on edge in a place free from dust for twenty-four hours, so as to allow the spirits of turpentine to evaporate. If this be not attended to carefully, the coating of gelatine and oxide of zinc which the plate is subsequently to receive will set in uneven patches, spoiling the resulting surface of the pictures and rendering them liable to stick. Then prepare the following mixture, called the "gelatine-zinc compound:" gelatine, such as that of Coignet Père et Fils et Cie or any other suitable gelatine, two ounces; cold water, twenty ounces. The proportion of gelatine to water depends upon the sample of gelatine employed, but the above is the proper proportion for that made by Coignet Père et Fils et Cie. Dissolve the above by heat in any suitable vessel. When the gelatine is dissolved, add the following, gently stirring with a glass rod until completely mixed: oxide of zinc and glycerine. The quality of ordinary oxide of zinc varies in the samples of commerce. With the ordinary quality sold by chemists the proper proportions of oxide and glycerine may be: oxide, one-half of an ounce; glycerine, one ounce. When using Hubbuck's oxide of zinc, we find fifty grains mixed with one-quarter of an ounce glycerine to be a very successful mixture; but experiment is necessary to determine the proportion to be employed with each sample of oxide. Any suitable dye or pigment may be added to this formula for the purpose of giving a tint of color to the resulting matte-opal type. These latter ingredients must be thoroughly brayed in a mortar until they form a smooth paste before being added to the gelatine solution. When the oxide of zinc and glycerine are thoroughly incorporated with the gelatine solution, strain the whole through a flannel bag. The plates coated with the waxing compound twenty-four hours previously may now be covered with the gelatine-zinc compound, which should not be used at a higher temperature than 130° Fahrenheit when the plates are dipped in the solution and not higher than 108° Fahrenheit when the solution is poured onto the plates and which may be effected in any of the modes used for photographic enameling or otherwise at the discretion of the operator. When the gelatine-zinc compound has set upon the plates, which will be usually in about a quarter of an hour, the plates will be fit to receive the albumenized-silver prints.

The prints must be prepared by first immersing them in clean cold water to render them flat and pliable. Rest the coated plates coated side up on a stand in a sink of suitable size. Flood them with clean cold water and brush the surface carefully with a broad flat camel's-hair brush to remove any particles of foreign matter. Then flood again with the clean cold water, take the silver prints from the water in which they are resting, and place carefully face down on the plates, taking care to avoid air-bubbles, squeegee in the usual manner, and then wipe with a sponge.

When glass plates are used, examine the under side for air-bubbles or particles of dust or other foreign matters that may have got between the face of the prints and the coating compound. If anything of the kind be present, remove the print affected, wash and brush again, and fix anew. When the prints are satisfactorily attached, wipe away all free moisture with the sponge. A backing of paper or mount may then be applied to them, and they are then placed in a rack to dry, which will happen in fine summer weather in from eighteen to twenty-four hours, or thereabout. When thoroughly dry, remove the print by inserting a pen-knife between it and the plate, and the former will leave the latter with the greatest ease, having a beautiful matte surface pure in tint and fine in texture.

Having now described and particularly ascertained the nature of our invention and in what manner the same is to be performed, we wish it to be understood that we do not confine ourselves to the exact details, which is not possible in such a process, and considerable practice will also be required to be able properly to perform our invention; but

What we claim as novel and useful, and desire to secure by Letters Patent, is—

1. The process of giving a matte surface to albumenized-silver-paper photographs or prints by covering the temporary supporting-plates of glass or other suitable material, such as marble, slate, or metal having a ground or roughened surface, with the hereinbefore-described waxing compound, and then covering them with an aqueous solution of gelatine, substantially as set forth.

2. The process of giving a matte surface possessing a peculiar bloom to albumenized-silver-paper photographs or prints by covering the temporary supporting-plates of glass or other suitable material, such as marble, slate, or metal having a ground surface covered with the hereinbefore-described waxing compound, and then covering them with an aqueous solution of gelatine mixed with oxide of zinc, substantially as set forth.

3. The process of giving a matte-colored surface to albumenized-silver-paper photographs or prints by covering plates of glass or other suitable material, such as marble, slate, or metal having a ground surface, with the waxing compound, and further covered with an aqueous solution of gelatine mixed with oxide of zinc and a suitable pigment.

JAMES DACIE WRIGGLESWORTH.
FREDERICK CHARLES BINNS.

Witnesses:
HENRY S. HUGHES,
*Engineer and Patent Agent, 4 Lambton Quay, Wellington, N. Z.*
W. E. HUGHES.